J. GANDOLFO.

APPARATUS FOR BURNING AND REVIVIFYING BONE-BLACK.

No. 7,146. Reissued May 30, 1876.

Witnesses:

A. Moraga.

F. V. Briesen

Inventor.

Jos. Gandolfo by his attorney

A. V. Briesen

N. PETERS, PHOTO-LITHOGRAPHER, WASHINGTON, D. C.

UNITED STATES PATENT OFFICE

JOSEPH GANDOLFO, OF BROOKLYN, NEW YORK.

IMPROVEMENT IN APPARATUS FOR BURNING AND REVIVIFYING BONE-BLACK.

Specification forming part of Letters Patent No. 165,992, dated July 27, 1875; reissue No. 7,146, dated May 30, 1876; application filed February 24, 1876.

*To all whom it may concern:*

Figure 2:
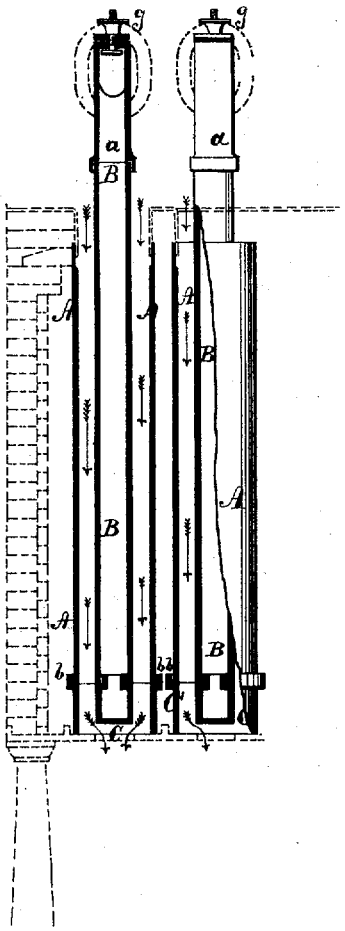
Figure 1:
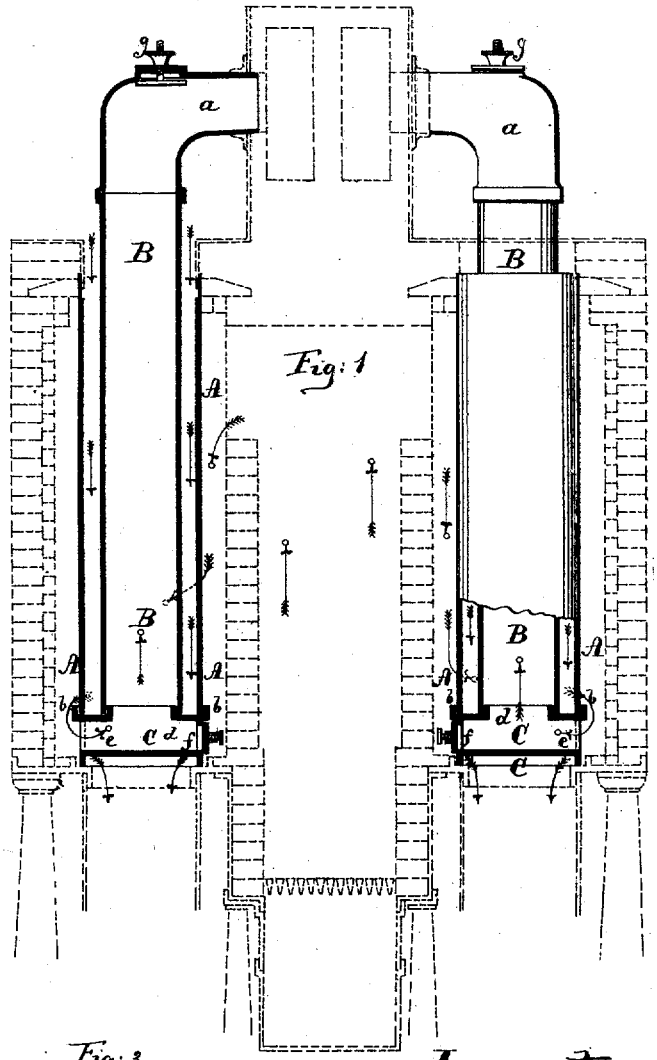
Figure 3:
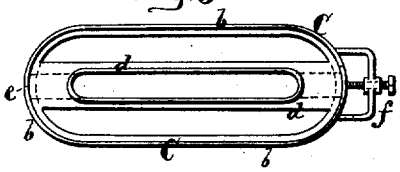

Be it known that I, JOSEPH GANDOLFO, of Brooklyn, in the county of Kings and State of New York, have invented a new and Improved Apparatus for Burning and Revivifying Bone-Black, &c., of which the following is a specification:

Figure 1 is a vertical cross-section of a furnace provided with my invention. Fig. 2 is a detail longitudinal section of part of the same. Fig. 3 is a top view, on a larger scale than the other figures, of the socket in which the lower ends of the burning-retort and interior smoke-flue are secured.

Similar letters of reference indicate corresponding parts in all the figures.

The object of this invention is to produce an apparatus for more rapidly and thoroughly burning or revivifying the animal charcoal, bone-black, soda, or other substance, than could heretofore be done.

My invention consists, principally, in conducting the products of combustion from the furnace through a short lateral flue into the lower end of a tube that extends lengthwise through the vertical retort, said retort being open at the lower end for the discharge of the bone-black, and also at the upper end for the discharge of the gases liberated during the revivifying process.

My invention also consists in a peculiar construction of socket that receives the lower end of the retort, and of a central smoke-flue, and conducts the products of combustion into said central smoke-flue, all as hereinafter more fully described.

I am aware that pipes have already been passed lengthwise through the vertical retorts of revivifying apparatus; but such pipes were, to my knowledge, never connected at their lower ends, by horizontal branch flues, with retorts, in such manner that said branch flues pass through the walls of the retort, or through the extension thereof.

In the drawing, and especially in Fig. 1, the body of the furnace is represented by dotted lines, the grate being also shown, and the course of the products of combustion being indicated by arrows having round points, the pointed arrows indicating the course of the bone-black or other substance to be burned.

Along each side of the furnace are erected twelve (more or less) retorts, A A, for receiving at their open upper ends the bone-black to be burned or revivified, and discharging the same at their open lower ends. A flue or central pipe, B, extends vertically through each retort A, but connects at its upper end, by an elbow, *a*, or otherwise, with the chimney of the furnace. In horizontal section the pipes B and retorts A may be of oval, polygonal, circular, or other suitable form. The lower end of each retort A is shown to rest on a socket, C, which is a short pipe of about the same form and size of cross-section as the retort, and constitutes a lower continuation of the retort, but made with a flange, *b*, at its upper end, and with a step for supporting the lower end of the retort. The flange *b* embraces the lower part of the retort, as shown in Figs. 1 and 2. The lower end of the socket C rests on a suitable plate, which is shown by dotted lines in Figs. 1 and 2, and which is built into the furnace, being perforated to allow the bone-black or other substance which is dropped through the retort, and through the socket C, to enter a suitable receptacle. The socket is traversed centrally by a hollow bridge or partition, *d*, which is open on top and closed at the bottom, and which constitutes the support and lower extremity of the flue B, as shown. A hole, *e*, is made through the side of the socket into the end of the hollow bridge or partition *d*, to allow the products of combustion from the furnace to enter the bridge or partitions *d* and the flue B.

I prefer to so place the socket that the hole *e* will be as far away as possible from the grate of the furnace. The socket may be made with more holes *e* than one, if desired.

Opposite to the hole *e* the hollow bridge *d* has a hand-hole, closed by a plate, *f*, to permit the cleaning of the said bridge or partition. A hand-hole is also, by preference, formed in the elbow *a* of the flue B, as indicated at *g* in the drawing, to permit the ready cleaning of the flue.

In operation, the flames of the furnace pass over fire-walls to the retorts, and play around the retorts, so as to heat their contents. The flames or products of combustion then enter the lower parts of the retorts through the holes *e*, and ascend through the flues B B, whence they escape into the chimney. Thus it is that the products of combustion affect both the outer and the inner walls of the retorts, whereby a more complete, equal, and rapid burning or revivifying of the bone-black or other substance can be accomplished than by the apparatus now in use. The bone-black or other substance is fed into the open upper end of the annular retort, and, in passing down into and through the socket C, is burned or revivified in the desired manner.

During this process the gases escaping from the bone-black are discharged and liberated through the open upper end of the retort, while the bone-black passes through the open lower end of the retort into a suitable receptacle.

Suitable shelves, ribs, or other detaining devices may, if desired, be arranged within each retort. My invention is also applicable to the burning or heating of soda in its manufacture.

I claim as my invention—

1. The revivifying or burning retort A, open at the upper end for the discharge of gases, and at the lower end for the discharge of the bone-black, and combined with the inner pipe B, whose lower part communicates, by the lateral flue *e*, which traverses the retort above its lower open end, with the fire-chamber of the furnace, substantially as herein shown and described.

2. The socket C, open on top and bottom to constitute a support for and a continuation of the retort A, and provided with the hollow bridge *d*, which is open on top and supports the flue B, and is closed at the bottom, and with the aperture or smoke-passage *e*, that leads into the hollow bridge, substantially as herein shown and described.

3. The combination of the retort A and pipe B with the socket C, which has the hollow bridge or partition *d*, substantially as herein shown and described.

JOSEPH GANDOLFO.

Witnesses:
A. V. BRIESEN,
OTTO A. WEIDNER.